United States Patent
Haas et al.

(10) Patent No.: US 10,256,994 B2
(45) Date of Patent: *Apr. 9, 2019

(54) OPEN VIRTUALIZED MULTITENANT NETWORK SCHEME SERVICING VIRTUAL MACHINE AND CONTAINER BASED CONNECTIVITY

(71) Applicant: Red Hat Israel, Ltd., Ra'anana (IL)

(72) Inventors: Edward Haas, Ra'anana (IL); Petr Horacek, Brno (CZ)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/906,688

(22) Filed: Feb. 27, 2018

(65) Prior Publication Data
US 2018/0198853 A1 Jul. 12, 2018

Related U.S. Application Data

(63) Continuation of application No. 15/404,752, filed on Jan. 12, 2017, now Pat. No. 9,912,739.

(51) Int. Cl.
*G06F 9/455* (2018.01)
*H04L 12/46* (2006.01)
*H04L 12/931* (2013.01)

(52) U.S. Cl.
CPC ...... *H04L 12/4641* (2013.01); *G06F 9/45558* (2013.01); *H04L 12/4625* (2013.01); *H04L 49/70* (2013.01); *G06F 2009/45595* (2013.01)

(58) Field of Classification Search
CPC ..... H04L 49/70; H04L 45/38; H04L 12/4641; H04L 41/12; H04L 67/1002;
(Continued)

(56) References Cited

U.S. PATENT DOCUMENTS

| 7,561,531 B2 | 7/2009 | Lewites et al. |
| 7,729,292 B2 * | 6/2010 | Cheshire ............... H04L 61/103 370/254 |

(Continued)

OTHER PUBLICATIONS

Van Elst, Remy, KVM Host with Bonding and VLAN Tagged Virtual Machines Setup on Ubuntu 12.04, dated Feb. 15, 2014 (13 pages) Link: https://raymii.org/s/tutorials/KVM_with_bonding_and_VLAN_tagging_setup_on_Ubuntu_12.04.html.
(Continued)

*Primary Examiner* — Sargon N Nano
(74) *Attorney, Agent, or Firm* — K&L Gates LLP

(57) ABSTRACT

A multitenant network scheme system includes a memory, a physical processor in communication with the memory, an isolated guest on a host, a virtual switch, and a network interface controller. The isolated guest includes a virtual network interface controller (vNIC). The virtual switch includes a plurality ports, which include a northbound port, a communication port, and a southbound port. The northbound port is connected to a network having a respective network name. Additionally, the northbound port is associated with a virtual local area network (VLAN). The communication port is connected to the vNIC of the isolated guest and is associated with the VLAN. The network interface controller is connected to the southbound port.

20 Claims, 6 Drawing Sheets

(58) Field of Classification Search
CPC ... H04L 41/0893; H04L 12/46; H04L 12/931; H04L 12/462; H04L 12/4633; H04L 12/4625; G06F 2009/45595; G06F 9/4558
See application file for complete search history.

(56) References Cited

U.S. PATENT DOCUMENTS

| | | | |
|---|---|---|---|
| 8,279,878 | B2 | 9/2012 | Takashige et al. |
| 8,761,187 | B2 | 6/2014 | Barde |
| 9,042,384 | B2 | 5/2015 | Sridharan et al. |
| 9,141,410 | B2 | 9/2015 | Leafe et al. |
| 9,304,798 | B2 | 4/2016 | Mudigonda et al. |
| 9,367,343 | B2 | 6/2016 | Tsirkin et al. |
| 9,405,568 | B2 | 8/2016 | Garg et al. |
| 9,454,395 | B2 | 9/2016 | Zhang et al. |
| 9,461,968 | B2 | 10/2016 | Chang et al. |
| 9,509,587 | B1 * | 11/2016 | Marquardt ............... H04L 45/02 |
| 2010/0014526 | A1 | 1/2010 | Chavan et al. |
| 2011/0255545 | A1 * | 10/2011 | Shin ................... H04L 12/4641 370/395.53 |
| 2013/0070762 | A1 * | 3/2013 | Adams ............... H04L 41/0893 370/389 |
| 2013/0219384 | A1 | 8/2013 | Srinivasan et al. |
| 2013/0227094 | A1 * | 8/2013 | Bailey ................... H04L 41/04 709/220 |
| 2013/0268588 | A1 | 10/2013 | Chang et al. |
| 2013/0283364 | A1 | 10/2013 | Chang et al. |
| 2013/0346583 | A1 * | 12/2013 | Low ................... H04L 12/4641 709/223 |
| 2014/0108632 | A1 | 4/2014 | Narasimha et al. |
| 2014/0129685 | A1 | 5/2014 | Bhatt |
| 2014/0161137 | A1 * | 6/2014 | Dasari .................. H04L 47/82 370/437 |
| 2014/0280809 | A1 * | 9/2014 | Li ...................... H04L 41/0806 709/222 |
| 2014/0373012 | A1 | 12/2014 | Ylitalo et al. |
| 2015/0205542 | A1 | 7/2015 | Antony |
| 2015/0363423 | A1 | 12/2015 | Utgikar et al. |
| 2016/0021032 | A1 * | 1/2016 | Maier .................... H04L 49/70 370/401 |
| 2016/0125488 | A1 | 5/2016 | Saha et al. |
| 2016/0182279 | A1 | 6/2016 | Gong et al. |
| 2016/0241515 | A1 | 8/2016 | Hosdurg et al. |
| 2016/0359917 | A1 | 12/2016 | Rao et al. |
| 2016/0381058 | A1 | 12/2016 | Jinto |
| 2017/0012940 | A1 | 1/2017 | Chang et al. |
| 2017/0063683 | A1 | 3/2017 | Li |
| 2017/0078198 | A1 | 3/2017 | Nellikar et al. |
| 2018/0109605 | A1 * | 4/2018 | Stephens ............. H04L 67/1008 |

OTHER PUBLICATIONS

Goldberg et al., Datacenter Network Virtualization in Multi-Tenant Environments, 2015 (10 pages) Link: https://www.net.in.tum.de/publications/papers/DatacenterNetworkVirtualizationInMulti-TenantEnvironments.pdf.

Pfaff et al., Extending Networking into the Virtualization Layer, Oct. 2009 (6 pages) Link: http://benpfaff.org/papers/ext-networking.pdf.

Configuring Network Isolation (12 pages) Link: http://docs.openstack.org/developer/tripleo-docs/advanced_deployment/network_isolation.html.

* cited by examiner

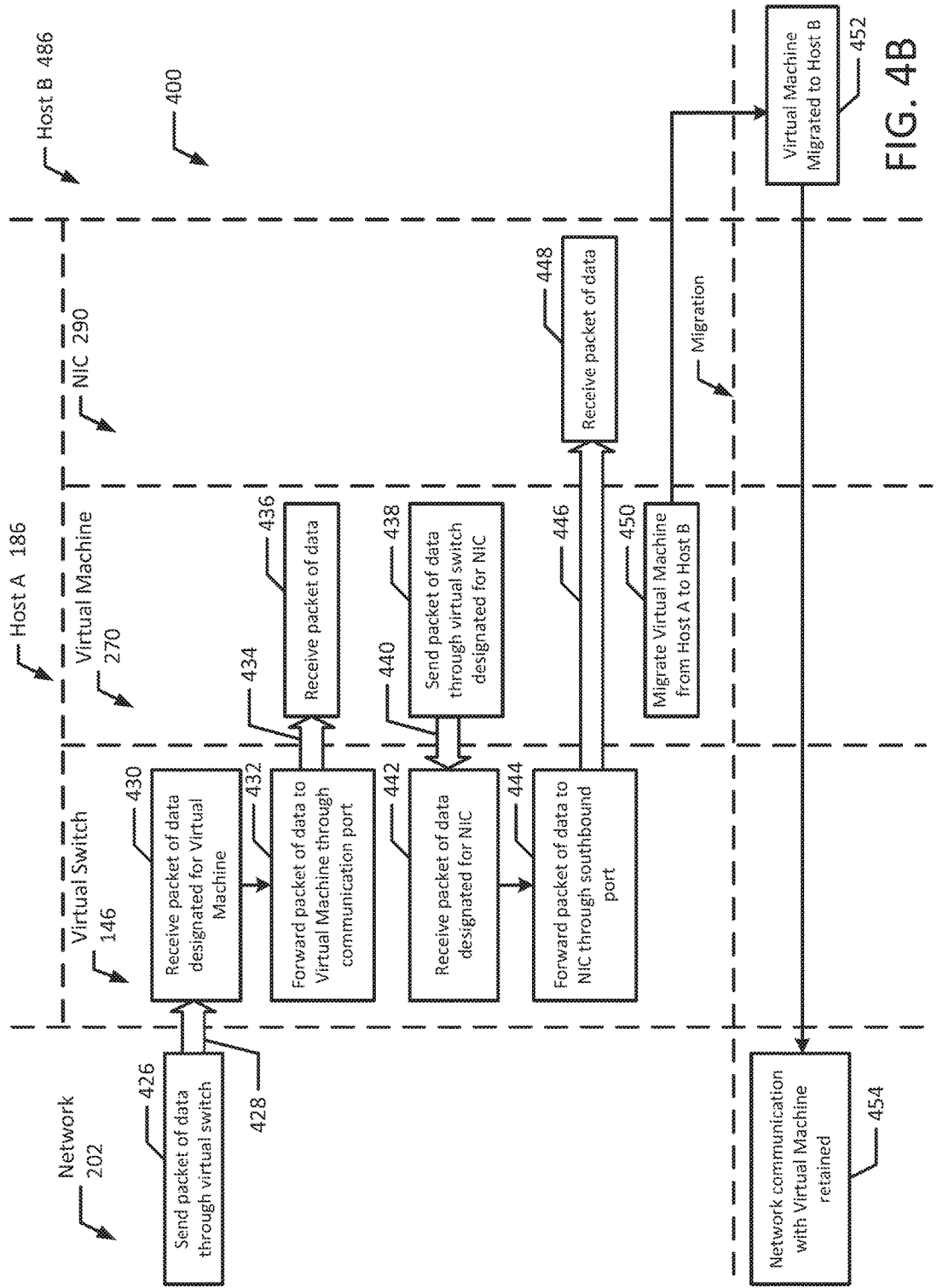

OPEN VIRTUALIZED MULTITENANT NETWORK SCHEME SERVICING VIRTUAL MACHINE AND CONTAINER BASED CONNECTIVITY

PRIORITY CLAIM AND CROSS-REFERENCE TO RELATED APPLICATION

The present application is a continuation of and claims priority to U.S. application Ser. No. 15/404,752, filed on Jan. 12, 2017, the entire contents of which are incorporated herein.

BACKGROUND

Computer systems may employ isolated guests such as virtual machines or containers that communicate with physical devices. A virtual machine (VM) is a software implementation of a computer that executes programs in a way similar to a physical machine. The isolated guest may share underlying physical hardware resources between different components of the computer system. Containerized and/or virtualized systems allow multiple isolated guests to run on a single physical host, which allows flexibility and scalability offered by running services or applications on the isolated guests. For example, an isolated guest may perform tasks associated with the functions of physical devices or other resources on the computer system by sending and receiving data over a network.

In some instances, such as in multitenant environments, it may be beneficial to move or migrate an isolated guest to a different host. For example, in larger systems that provide data access, networking, and storage to a large pool of shared resources, computing resources may be delivered in a multitenant environment to various end users.

SUMMARY

The present disclosure provides new and innovative systems and methods of an open virtualized multitenant network scheme servicing virtual machine and container based connectivity. In an example embodiment, a system includes a memory, at least one physical processor in communication with the memory, an isolated guest on a host, a virtual switch, and one or more network interface controllers. The isolated guest is either a virtual machine or a container, and the isolated guest includes a virtual network interface controller (vNIC). The virtual switch includes a plurality of ports, which include one or more northbound ports, a communication port, and a southbound port. The one or more northbound ports are connected to one or more respective networks having one or more respective network names. Additionally, the northbound ports are respectively associated with a virtual local area network (VLAN). The communication port is connected to the vNIC of the isolated guest and is associated with the virtual local area network (VLAN). The one or more network interface controllers is connected to the southbound port.

In an example embodiment, a method includes defining one or more networks having one or more respective network names and creating a virtual switch including a plurality of ports. The plurality of ports includes one or more northbound ports and a southbound port. Then, configuring the one or more northbound ports to connect to the one or more respective networks, configuring the southbound port to connect to one or more network interface controllers, and attaching a virtual network interface controller (vNIC) of an isolated guest to a communication port. The northbound ports are respectively associated with a virtual local area network (VLAN). The communication port is created when the vNIC is attached to the virtual local area network (VLAN). The isolated guest is on a host, and the isolated guest is either a virtual machine or a container. Then, the isolated guest establishes connection with the one or more networks based on the respective one or more network names.

In an example embodiment, a non-transitory machine readable medium stores a program, which when executed by a processor, which causes a processor to define one or more networks having one or more respective network names and create a virtual switch. The virtual switch includes a plurality of ports, which include one ore more northbound ports and a southbound port. The non-transitory machine readable medium also causes the processor to configure the one or more northbound ports to connect to the one or more respective networks, configure the southbound port to connect to one or more network interface controllers, and attach a virtual network interface controller (vNIC) of an isolated guest to a communication port. The northbound ports are respectively associated with a virtual local area network (VLAN). The communication port is created when the vNIC is attached to the virtual local area network (VLAN). Additionally, the isolated guest is on a host, and the isolated guest is either a virtual machine or a container. The non-transitory machine readable medium also causes an isolated guest to establish connection with the one or more networks based on the respective one or more network names.

Additional features and advantages of the disclosed method and system are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIGS. 4A and 4B illustrate a flow diagram of an example process for creating a virtualized multitenant network scheme according to an example embodiment of the present disclosure.

DETAILED DESCRIPTION OF EXAMPLE EMBODIMENTS

Techniques are disclosed for providing open virtualized multitenant network schemes, which may be used to service virtual machine and container based connectivity. Network schemes provide network facilities to a virtualized system by enabling connectivity to virtual machines and containers. Generally, network schemes are implementation specific and utilize the capabilities of a specific virtual network solution on a specific host.

However, implementation specific network schemes lack the flexibility to work independent from the underlying network implementation. For example, implementation specific network schemes may fail when migrating a virtual machine from a host, which implements one type of network, to a host that implements a different type of network.

As discussed in the various example embodiments disclosed herein, to retain network connectivity when migrating between hosts implementing different types of networks, network virtualization scheme can be implemented to support networking changes on different hosts. For example, by defining a network with a network name, creating a virtual switch, and configuring the ports to connect to various networks, network interface controllers of the host and the isolated guests, the isolated guest can establish connection with the network based on the network name and retain connection with the network after migrating to a different host. For example, the network virtualization scheme allows the isolated guest to establish and retain connection with the network regardless of the type of network implementation used on each host. Additionally, when an isolated guest such as a virtual machine or a container is moved to another host with the same scheme, the isolated guest can be interpreted in the same manner.

The various example embodiments disclosed herein advantageously enable connectivity of virtual machines and/or containers to multiple networks. Additionally, the examples disclosed herein are capable of multitenancy support by allowing the reuse of virtual local area network(s) and IP address between different tenants. For example, one tenant may use VLAN 100 through 200 on a virtual switch and another tenant may use VLAN 100 through 200 on a different virtual switch. Furthermore, the examples disclosed herein advantageously allow virtual machine migration across nodes and hosts while retaining connection to the correct network on the target host.

Figure 1:
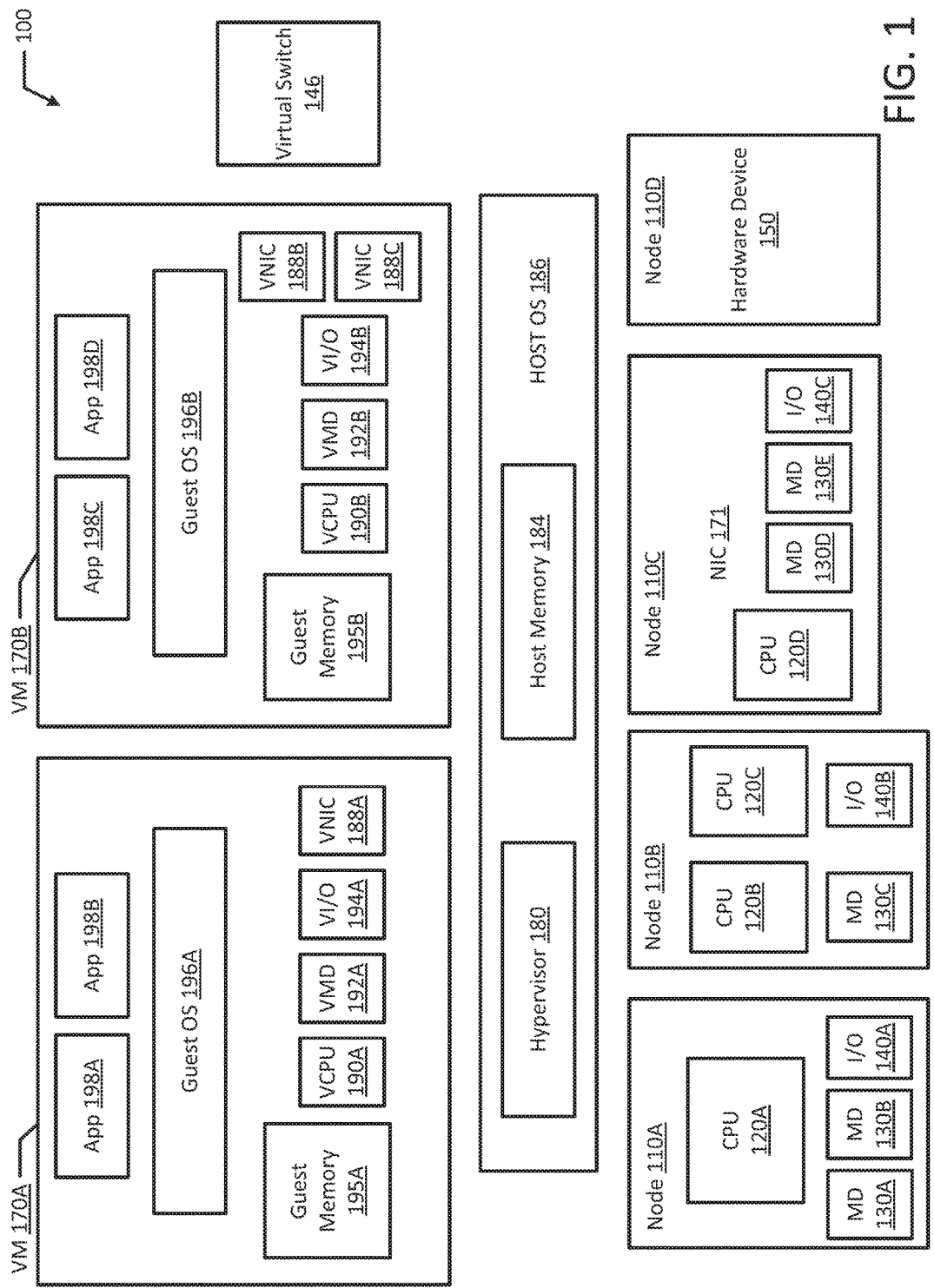
FIG. 1 illustrates a block diagram of an example virtualization computer system according to an example embodiment of the present disclosure.

FIG. 1 depicts a high-level component diagram of an example virtualization computer system 100 in accordance with one or more aspects of the present disclosure. The virtualization computer system 100 may include a memory (e.g., MD 130A-E), at least one physical processor (e.g., CPU 120A-D) in communication with the memory (e.g., MD 130A-E), an isolated guest (e.g., VM 170A-B) on a host (e.g., Host OS 186), and a virtual switch 146. The virtual switch 146 may be responsible for forwarding packets and supporting features such as aggregation, tunneling, firewalls, etc.

Isolated guests, such as virtual machines 170A-B may include a guest, guest memory, a virtual CPU, virtual memory devices, and virtual input/output devices. For example, virtual machine 170A may include guest OS 196A, guest memory 195A, a virtual CPU ("VCPU") 190A, a virtual memory device ("VMD") 192A, a virtual input/output device ("VI/O") 194A, and a virtual network interface controller ("VNIC") 188A. In an example, the virtualization computer system 100 may include additional isolated guests such as other virtual machines and/or containers, such as VM 170B.

Guest memory (e.g., Guest Memory 195A-B) may include one or more memory pages. Host memory 184 may also be divided into one or more memory pages, which may be managed by the hypervisor 180. Guest memory (e.g., Guest Memory 195A-B) allocated to the guest (e.g., guest OS 196A-B) may be mapped from host memory 184 such that when a guest application uses or accesses a memory page of guest memory 195A-B it is actually using or accessing host memory 184.

The virtualization computer system 100 may run multiple virtual machines (e.g., VM 170A-B), by executing a software layer (e.g., hypervisor 180) above the hardware and below the virtual machines 170A-B, as schematically shown in FIG. 1. In an example, the hypervisor 180 may be a component of the host operating system 186 executed by the virtualization computer system 100. In another example, the hypervisor 180 may be provided by an application running on the operating system 186, or may run directly on the virtualization computer system 100 without an operating system beneath it. The hypervisor 180 may virtualize the physical layer, including processors, memory, and I/O devices, and present this virtualization to virtual machines 170A-B as devices, including virtual processors (e.g., VCPU 190A), virtual memory devices (e.g., VMD 192A), virtual I/O devices (e.g., VI/O 194A), and/or virtual network interface controllers (e.g., VNIC 188A). Also, similar to illustrated VM 170A, VM 170B may include one or more VCPUs (e.g., VCPU 190B), VMDs (e.g., VMD 192B), VI/O devices (e.g., 194B), and/or VNICs (e.g., VNIC 188B-C).

In an example, a virtual machine 170A may execute a guest operating system 196A which may utilize the underlying VCPU 190A, VMD 193A, VI/O device 194A, and VNIC 188A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS (e.g., host OS 186). In an example, applications (e.g., App 198A-B) run on a virtual machine 170A may be dependent on the underlying hardware and/or host OS 186. In another example, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., App 198C-D) run on a second virtual machine (e.g., VM 170B) are independent of the underlying hardware and/or host OS 186. Additionally, applications 198A-B run on a virtual machine 170A may be compatible with the underlying hardware and/or OS 186. In an example, applications 198A-B run on a virtual machine 170A may be incompatible with the underlying hardware and/or host OS 186. For example, applications 198A-B run on one virtual machine 170A may be compatible with the underlying hardware and/or host OS 186 while applications run on another virtual machine 170B are incompatible with the underlying hardware and/or host OS 186. In an example, a device may be implemented as a virtual machine (e.g., virtual machine 170A-B).

The virtualization computer system 100 may include one or more interconnected nodes 110A-D. Each node 100A-D may in turn include one or more physical processors (e.g., CPU 120A-D) communicatively coupled to memory devices (e.g., MD 130A-E) and input/output devices (e.g., I/O 140A-C). Node 110C may embody a network interface controller (NIC) 171. Additionally, node 110D may include a device such as a hardware device 150. In an example, a hardware device 150 may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, a physical processor or a processor 120A-D refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-E refers to a volatile or non-volatile memory device, such as RAM, ROM, EEPROM, or any other device capable of storing data. Also, as discussed herein, I/O device 140A-C refers to a device capable of providing an interface between one or more processor pins and an external device capable of inputting and/or outputting binary data.

Processors 120A-D may be interconnected using a variety of techniques, ranging from a point-to-point processor interconnect, to a system area network, such as an Ethernet-based network. Local connections within each node and/or between nodes, including the connections between a processor 120A-D and a memory device 130A-E and between a processor 120A-D and an I/O device 140A-C, may be provided by one or more local buses of suitable architecture, for example, peripheral component interconnect (PCI).

Figure 2:
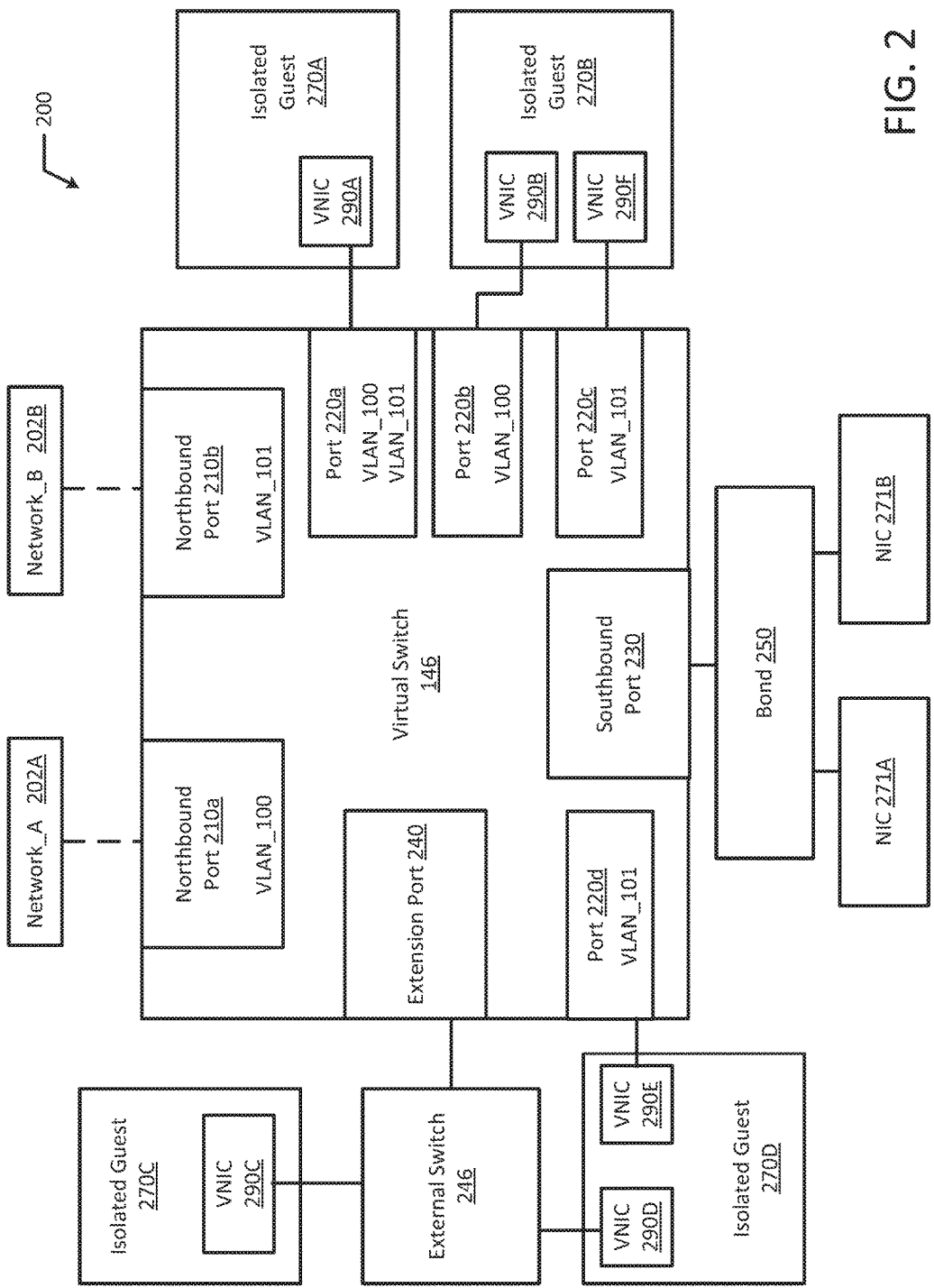
FIG. 2 illustrates a virtualized multitenant network scheme according to an example embodiment of the present disclosure.

FIG. 2 illustrates a virtualized multitenant network scheme 200 according to an example of the present disclosure. The virtual switch 146 may include one or more northbound ports (e.g. port 210a-b), one or more communication ports (e.g. port 220a-d), and a southbound port 230. In an example, the virtual switch 146 may also include an extension port 240.

The northbound ports 210a-b connect the virtual switch 146 to the host stack (e.g., higher level layers of the host) and represent a network (e.g., "Network_A" 202A, "Network_B" 202B). For example, multiple northbound ports (e.g., northbound port 210a-b) enable a virtual switch 146 to represent multiple networks (e.g., "Network_A" 202A, "Network_B" 202B). Each northbound port 210a-b may be associated with a single virtual local area network ("VLAN"). For example, VLAN_101 may group the northbound port 210b with its attached communication ports (e.g., ports 220a, 200c, and 220d).

Similarly, a communication port 220 may be associated with a single VLAN. In another example, a communication port 220 may not be associated with any VLAN. For example, if there is no VLAN number defined on a communication port 220, the communication port 220 may serve as a trunk port, which passes the traffic as received from other ports without modification. For example, a trunk port may pass network traffic without adding or striping VLAN tags. Additionally, a communication port 220 with multiple VLAN numbers defined on it may also serve as a trunk port, which passes network traffic associated with the respective multiple VLAN numbers. For example, communication port 220a may serve as a trunk port that has VLAN_100 and VLAN_101 defined on it. The communication ports (e.g., ports 220a-d) connects the virtual switch 146 to an isolated guest 270 such as a virtual machine or a container.

The southbound port 230 may be shared among multiple networks (e.g., network 202A-B). For example, the southbound port 230 may be shared by all the networks on the virtual switch 146. In an example, there is a single southbound port 230 per switch (e.g., virtual switch 146 or external switch 246). The extension port 240 may also be shared among multiple networks on the virtual switch 146.

An isolated guest 270 may have one or more virtual network interface controllers ("vNIC") 290. For example, an isolated guest (e.g., isolated guest 270B) may include multiple vNICs (e.g., vNIC 290B and 290F). Additionally, each of the vNICs on a single isolated guest 270 may be connected to different respective ports (e.g., each vNIC connected to a single port). For example, vNIC 290B may be connected to communication port 220b while vNIC 290F is connected to communication port 220c. In a further example, a vNIC (e.g., vNIC 290A) may be defined as a trunk of two VLANs. For example, communication port 220a may be a trunk port that accepts VLAN_100 and VLAN_101 and vNIC 290A may be defined as a trunk of VLAN_100 and VLAN_101. In an example, the multiple vNICs (e.g., vNIC 292D and 290E) on an isolated guest (e.g., isolated guest 270D) may be connected to ports on different switches (e.g., switch 146, 246). In an example, an isolated guest (e.g., 270A-B) may be a virtual machine. In another example, an isolated guest (e.g., 270C) may be a container. In an example, the isolated guest 270 may be a container executing on a virtual machine.

The southbound port 230 may be connected to a bond 250. The bond 250 may connect the southbound port 230 to one or more network interface controllers (e.g., NIC 271A-B). For example, the southbound port 230 and/or the bond 250 may connect the virtual network to the physical interface (e.g., NIC 271A-B). In an example, the bond 250 may be a virtual interface. Additionally, ports may be aggregated together into a group and defined as the bond 250. For example, the southbound port 230 may serve as the bond 250.

The virtual switch 146 may also include an extension port 240. For example, the extension port 240 may connect the virtual switch 146 to an external switch 246. In an example, the external switch 246 is a different virtual switch. The extension port 240 also referred to as a gateway port provides an extension point for the virtual switch 146, allowing the virtual switch 146 to connect to other switches (e.g., external switch 246) or entities. The extension port 240 may advantageously extend the capabilities of the virtual switch 146 by providing connectivity to other networks and/or devices.

Figure 3:
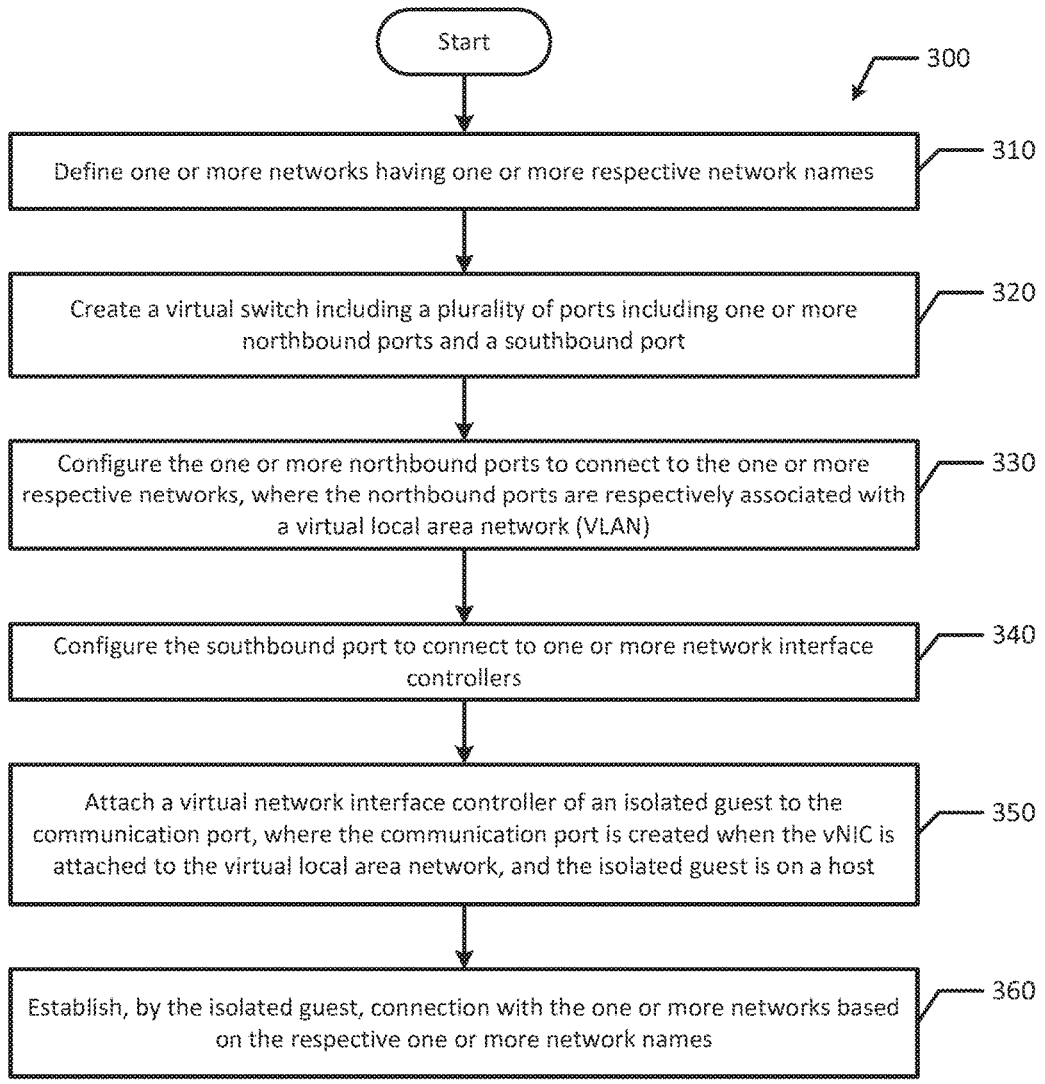
FIG. 3 illustrates a flowchart of an example process for creating a virtualized multitenant network scheme according to an example embodiment of the present disclosure.

FIG. 3 illustrates a flowchart of an example method 300 in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may include hardware (circuitry, dedicated logic, etc.), software, or a combination of both.

The example method 300 includes defining one or more networks having one or more respective network names (block 310). In an example, a network 202 may have a network name, such as "Network_A". By defining a network 202 with a network name, the network can advantageously be interpreted by an isolated guest 270 in the same manner when the isolated guest 270 is moved to another host. Then, a virtual switch is created with a plurality of ports including one or more northbound ports and a southbound port (block 320). For example, when creating the virtual switch 146, a northbound port 210 may be created. The one or more northbound ports (e.g., northbound port 210a-b) may connect the virtual switch 146 to the host stack (e.g., the higher level layers of the host). Additionally, when creating the virtual switch 146, the southbound port 230 may be created. The southbound port 230 may connect the virtual switch 146 to physical devices such as network interface controllers (e.g., NIC 271A-B).

Then, the one or more northbound ports are configured to connect to the one or more respective networks, where the northbound ports are respectively associated with a virtual local area network (VLAN) (block 330). For example, the northbound ports 210a-b may be configured to connect to Network 202A-B and may be respectively associated with a virtual local area network (e.g., VLAN_100 and VLAN_101). By connecting the northbound ports 210a-b of the virtual switch 146 to multiple networks (e.g., Network 202A-B), the virtual switch 146 may advantageously connect virtual machines and/or containers to multiple networks. Next, the southbound port is configured to connect to one or more network interface controllers (block 340). For example, the southbound port 230 may be configured to connect to a network interface controller(s) (e.g., NIC 271A-B). In an example, the southbound port 230 may be connected to a bond 250, which is connected to one or more network interface controllers 271.

Then, a virtual network interface controller of an isolated guest is attached to the communication port, where the communication port is created when the vNIC is attached to the virtual local area network (block 350). For example, a virtual network interface controller 290 of an isolated guest 270 may be attached to a communication port 220. In an example, the communication ports 220 may be created when a vNIC 290 is attached to the network 202 and/or the virtual local area network (e.g., VLAN_100 and/or VLAN_101). In another example, the communication ports 220 may be created in advance when the network 202 is created. At this point, the virtual switch 146 enables communication between physical devices, such as NIC 271 and isolated guest over one or more networks 202.

Then, the isolated guest establishes connection with one or more networks based on the respective one or more network names (block 360). For example, the isolated guest 270 may establish connection with Network 202A based on the respective network name (e.g., "Network_A"). In an example, the isolated guest 270 may be migrated from its original host (e.g., "Host A" 186) to a different host (e.g., "Host B" 486) and may establish connection with one or more networks (e.g., Network 202A-B) based on the one or more network names (e.g., "Network_A" and/or "Network_B") after migration. The isolated guest 270 advantageously retains communication with the one or more networks (e.g., Network 202A-B) after migration. Thus, the virtualized network scheme advantageously allows virtual machine migration across nodes and/or hosts by connecting the isolated guest 270 to the correct network 202 on the target host and/or node.

Figure 4A:
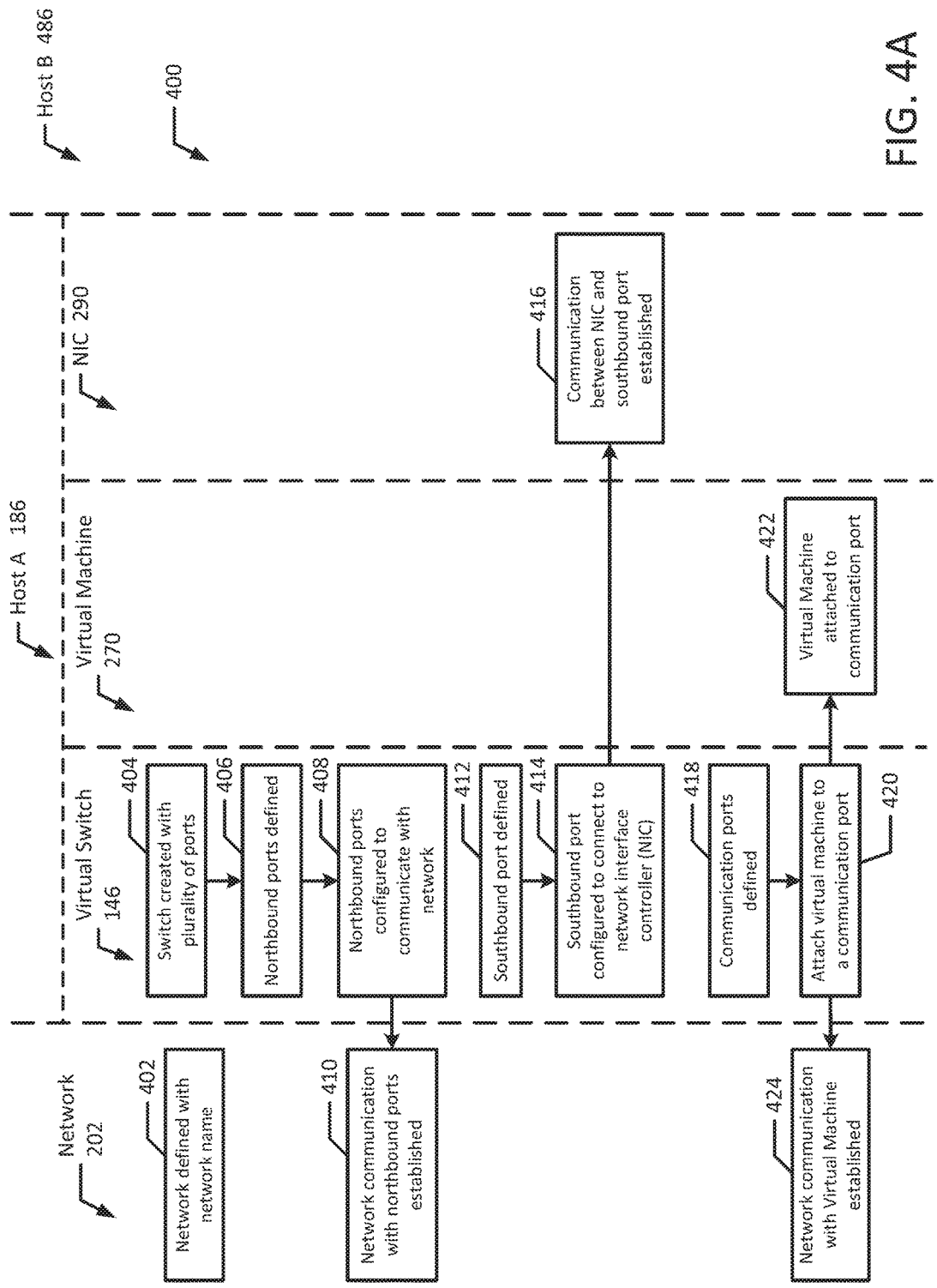

FIGS. 4A and 4B depict a flow diagram illustrating an example method 400 according to an example embodiment of the present disclosure. Although the example method 400 is described with reference to the flow diagram illustrated in FIGS. 4A and 4B, it will be appreciated that many other methods of performing the acts associated with the method may be used. For example, the order of some of the blocks may be changed, certain blocks may be combined with other blocks, and some of the blocks described are optional. The method may be performed by processing logic that may include (e.g., circuitry, dedicated logic, etc.), software, or a combination of both. For example, virtual switch 146, NIC 290, and virtual machine 270 on host 186 (or host 486 after migration) may communicate via a network 202 to perform example method 400.

In the illustrated example, a network may be defined (block 402). In an example, the network 202 may be defined by a network name. For example, the network may have a network name such as "Network_A". A virtual switch may be created with a plurality of ports (block 404). For example, the virtual switch 146 may include a northbound port 210, a plurality of communication ports 220, and a southbound port 230. Then, northbound port(s) 210 may be defined (block 406). For example, a port (e.g., the northbound port 210) may be named as the network such that the northbound port 210 is associated with a specific network (e.g., Northbound port 210a associated with Network 202A). In an example, the northbound port 210 is associated with a single VLAN (e.g., northbound port 210a associated with VLAN_100). In another example, the northbound port 210 is not associated with a VLAN. Additionally, northbound port(s) may be configured to communicate with a network (block 408). For example, the northbound port(s) 210 may be configured to communicate with a network 202 such that the virtual switch 146 may process network traffic. Then, network communication with northbound ports may be established (block 410). For example, network communication between the virtual switch 146 and a host stack (e.g., higher level layers of the host) is established. In an example, the virtual switch 146 may establish network communication with multiple networks (e.g., Network 202A-B).

Also, a southbound port may be defined (block 412). For example, a port may be defined as the southbound port 230, which may connect the virtual switch 146 to physical devices on the host 186. In an example, the southbound port 230 may connect the virtual switch 146 to a bond 250 or one or more physical devices. The virtual switch 146 may have a single southbound port 230, and the southbound port 230 may be shared among multiple networks 202. Additionally, the southbound port may be configured to connect to a network interface controller (block 414). For example, the southbound port 230 may be configured to connect to a physical device, such as NIC 271. In an example, the southbound port 230 may be configured to connect to multiple physical devices (e.g., NIC 271A-B). Additionally, the southbound port 230 may connect to a bond 250, which is connected to one or more physical devices, such as NIC 217A-B. Then, communication between the NIC and southbound port may be established (block 416). For example, communication between the NIC 271A-B and the southbound port 230 may be established such that information may be passed between the virtual switch 146 and physical devices (e.g., NIC 271A-B) on the host 186.

Communication ports may be defined (block 418). For example, several ports may be defined as communication ports 220. In an example, the communication ports 220 connect the virtual switch 146 to an isolated guest (e.g., virtual machine and/or a container). In another example, a communication port 220 may be associated with a single VLAN. Additionally, a communication port 220 may not be associated with a VLAN and may serve as a trunk port.

Then, a virtual machine may be attached to a communication port (blocks 420 and 422). For example, a vNIC 290 on a virtual machine 270 may be attached to a communication port 220 of the virtual switch 146. In an example, a virtual machine 270A may be attached to one virtual switch 146, while a second virtual machine or container 270C is attached to a different virtual switch (e.g., external switch 246). Additionally, an isolated guest (e.g., virtual machine or container), such as isolated guest 270D may be connected to two different switches (e.g., external switch 246 via vNIC 290D and virtual switch 146 via vNIC 290E). After the virtual machine is connected, network communication with the virtual machine may be established (block 424). For example, communication between the virtual machine 270 and the network 202 may be established such that information may be passed between the virtual switch 146 and virtual machine 270.

Then, the network may send packets of data through the virtual switch (blocks 426 and 428). For example, network 202 may send packets of data through the virtual switch 146 to the isolated guests 270 such as virtual machines and/or containers. After network communication has been established, the network scheme advantageously connects an isolated guest 270 (e.g., virtual machine or a container) to multiple networks thereby enabling data transfer between multiple isolated guests 270 and networks 202. The virtual switch may receive packets of data designated for the virtual machine (block 430). For example, the virtual switch 146 may receive packets of data from NIC 271A through southbound port 230 that is designated for virtual machine 270. Additionally, the virtual switch 146 may receive network data through northbound port 210 designated for virtual machine 270. Then, the virtual switch may forward packets of data to the virtual machine through the communication port (blocks 432 and 434), and the virtual machine may receive packets of data (block 436). For example, packet data associated with VLAN_101 and designated for virtual machine 270A may be forwarded by virtual switch 146 to virtual machine 270A.

The virtual machine may send packets of data through the virtual switch designated for the NIC (blocks 438 and 440). Similarly, the virtual machine 270 may send packets of data through the virtual switch 146 that are designated for a physical device such as NIC 271. Then, the virtual switch may receive packets of data designated for the NIC (block 442), and the virtual switch may forward packets of data to NIC through the southbound port (blocks 444 and 446). In an example, the virtual switch 146 may send packets of data to the NIC 271 through the southbound port 230. In an example, the packets of data may be sent through a bond 250. Then, the NIC may receive packets of data (block 448).

Then, the virtual machine may be migrated from host A to host B (blocks 450 and 452). For example, the virtual machine 270 may be migrated from an original host 186 (e.g., "Host A") to a different host 486 (e.g., "Host B"). In an example embodiment, the virtual machine 270 may be migrated to a different node. Additionally, a different isolated guest 270, such as a container, may be moved to a different host or node. After migration, network communication with the virtual machine may be retained (block 454). For example, the network scheme advantageously allows the virtual machine 270 to re-establish network communication with the network 202 after migration such that network connectivity is retained. Thus, the network scheme advantageously enables cluster network identification such that a virtual machine 270 can migrate across nodes and/or hosts (e.g., host 186, 486) while retaining connection to the correct network 202 on the target node and/or host (e.g., host 486).

Figure 5:
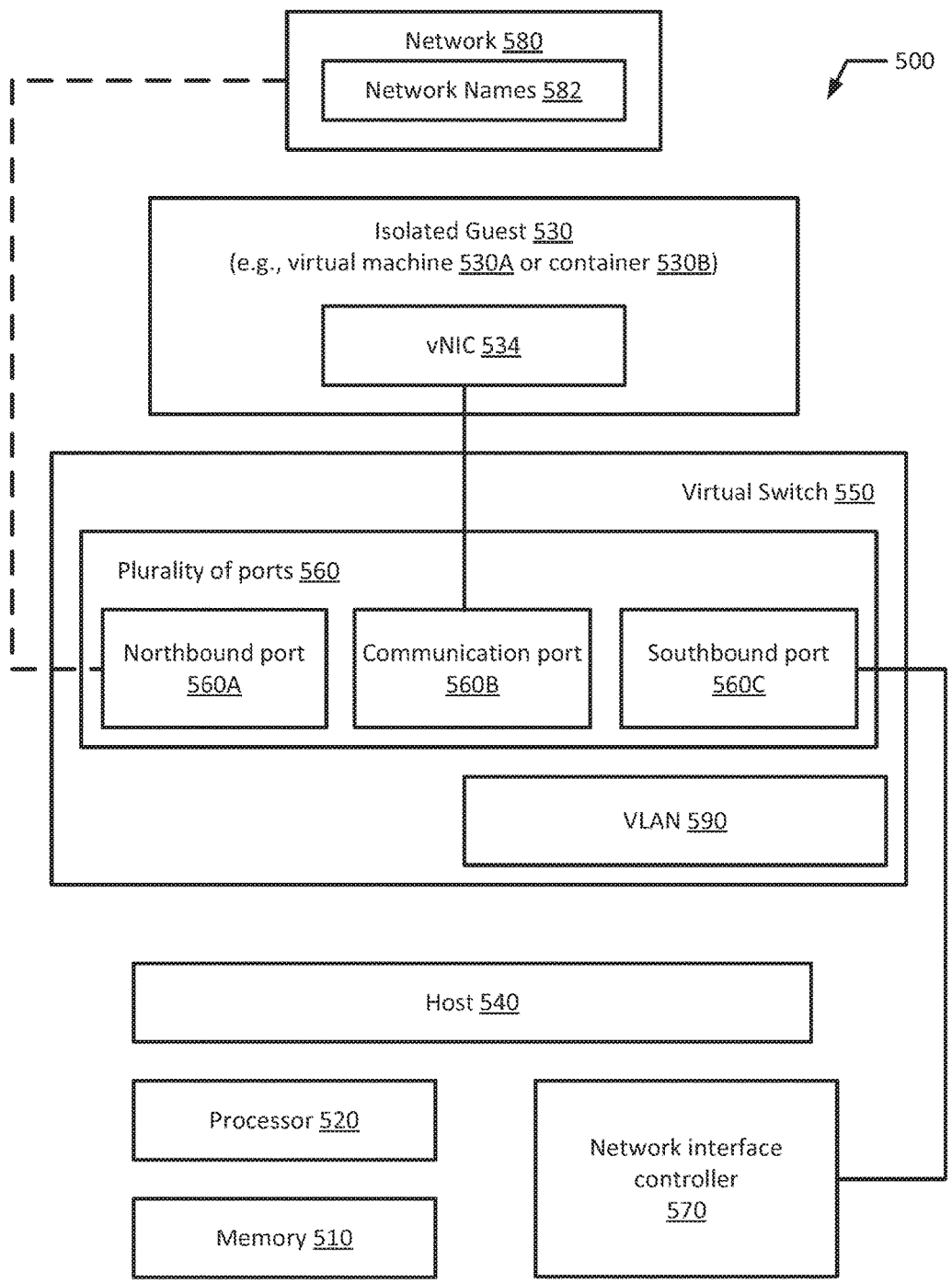
FIG. 5 illustrates a block diagram of an example multitenant network scheme system according to an example embodiment of the present disclosure.

FIG. 5 is a block diagram of an example multitenant network scheme system 500 according to an example embodiment of the present disclosure. The system 500 system includes a memory 510, at least one physical processor 520 in communication with the memory 510, an isolated guest 530 on a host 540, a virtual switch 550, and one or more network interface controllers 570. The isolated guest 530 may be a virtual machine 530A or a container 530B. Additionally, the isolated guest 530 may include a virtual network interface controller (vNIC) 534. The virtual switch 550 includes a plurality of ports 560. The plurality of ports 560 includes one or more northbound ports 560A connected to one ore more respective networks 580 having one or more respective network names 582. Additionally, the one or more northbound ports 560A may be associated with a virtual local area network (VLAN) 590. The plurality of ports 560 also includes a communication port 560B connected to the vNIC 534 of the isolated guest 530. The communication port 560B may be associated with the virtual local area network 590. Additionally, the plurality of ports 560 includes a southbound port 560C. The one or more network interface controllers 570 may be connected to the southbound port 560C.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
at least one physical processor in communication with the memory;
an isolated guest including a virtual network interface controller (vNIC);
a virtual switch including:
a northbound port connected to a respective network having a respective network name, wherein the northbound port is respectively associated with a virtual local area network (VLAN),
a communication port connected to the vNIC of the isolated guest, wherein the communication port is associated with the virtual local area network (VLAN), and
a southbound port; and one or more network interface controllers connected to the southbound port.

2. The system of claim 1, wherein the southbound port connects to a virtual interface, wherein the virtual interface is a bond.

3. The system of claim 2, wherein the bond connects the southbound port to at least two network interface controllers.

4. The system of claim 1, further comprising a second isolated guest and a second communication port.

5. The system of claim 4, wherein the second isolated guest includes a plurality of vNICs.

6. The system of claim 5, wherein a first vNIC of the plurality of vNICs is connected to the communication port associated with the VLAN, and a second vNIC of the plurality of vNICs is connected to the second communication port associated with a second VLAN.

7. The system of claim 1, wherein the virtual switch further comprises an extension port to connect the virtual switch to a second virtual switch.

8. The system of claim 1, further comprising a cluster of hosts including a first host and a second host, wherein the isolated guest is configured to migrate from the first host to the second host.

9. A method comprising:
configuring a northbound port of a virtual switch to connect to a respective network, wherein the northbound port is respectively associated with a virtual local area network (VLAN);
configuring a southbound port of the virtual switch to connect to a network interface controller;
attaching a virtual network interface controller (vNIC) of an isolated guest to a communication port on the virtual switch; and
establishing, by the isolated guest, connection with the respective network based on a respective network name.

10. The method of claim 9, wherein the southbound port connects to a virtual interface, wherein the virtual interface is a bond.

11. The method of claim 10, further comprising connecting the southbound port to at least two network interface controllers.

12. The method of claim 11, wherein the at least two network interface controllers include a first network interface controller (NIC) and a second NIC, the virtual switch forwards a first packet of data to the first NIC through the southbound port, and the virtual switch forwards a second packet of data through the communication port.

13. The method of claim 9, further comprising attaching a second isolated guest to the communication port and attaching the second isolated guest to a second communication port of the virtual switch.

14. The method of claim 13, wherein attaching the second isolated guest to the communication port includes connecting a second vNIC of the second isolated guest to the communication port.

15. The method of claim 9, wherein the communication port is created prior to creation of the respective network.

16. The method of claim 9, further comprising connecting the virtual switch to a different switch, wherein connecting the virtual switch to the different switch includes creating an extension port from a plurality of ports on the virtual switch and configuring the extension port to connect to the different switch.

17. The method of claim 9, further comprising migrating the isolated guest from a host to a different host and establishing, by the isolated guest, connection with the network based on the respective network name, such that the connection is retained using the same network name after migration.

18. The method of claim 9, wherein the isolated guest is a virtual machine and one or more applications run on the virtual machine.

19. The method of claim 9, wherein the communication port serves as a trunk port.

20. A non-transitory machine readable medium storing a program, which when executed by a processor, which causes a processor to:
configure a northbound port of a virtual switch to connect a respective network, wherein the northbound port is respectively associated with a virtual local area network (VLAN);
configure a southbound port of the virtual switch to connect to a network interface controller;
attach a virtual network interface controller (vNIC) of an isolated guest to a communication port on the virtual switch; and
establish, by the isolated guest, connection with the respective network based on a respective network name.

* * * * *